(12) United States Patent
Lee et al.

(10) Patent No.: US 7,773,475 B2
(45) Date of Patent: Aug. 10, 2010

(54) OPTICAL PICKUP ACTUATOR AND OPTICAL RECORDING/REPRODUCING APPARATUS HAVING THE SAME

(75) Inventors: Myoung-wook Lee, Suwon-si (KR); Jae-seong Shim, Anyang-si (KR); Kyu-chul Bang, Seoul (KR)

(73) Assignee: Samsung Electronics Co. Ltd, Suwon-si (KR)

( * ) Notice: Subject to any disclaimer, the term of this patent is extended or adjusted under 35 U.S.C. 154(b) by 1220 days.

(21) Appl. No.: 11/349,221

(22) Filed: Feb. 8, 2006

(65) Prior Publication Data

US 2006/0245318 A1  Nov. 2, 2006

(30) Foreign Application Priority Data

Apr. 27, 2005  (KR) ...................... 10-2005-0035057

(51) Int. Cl.
  *G11B 7/00* (2006.01)
(52) U.S. Cl. ................................. 369/53.19; 369/44.32
(58) Field of Classification Search ............... 369/53.19
  See application file for complete search history.

(56) References Cited

U.S. PATENT DOCUMENTS

2005/0007906 A1 * 1/2005 Horinouchi et al. ...... 369/44.37
2005/0219988 A1 * 10/2005 Atarashi et al. ........ 369/112.08

FOREIGN PATENT DOCUMENTS

| JP | 09-306012 | 11/1997 |
|----|-----------|---------|
| JP | 10-011765 | 1/1998 |
| JP | 2002-245650 | 8/2002 |
| JP | 2003-157556 | 5/2003 |
| KR | 1998-4500 | 3/1998 |
| KR | 2004-21324 | 3/2004 |

* cited by examiner

*Primary Examiner*—Peter Vincent Agustin
*Assistant Examiner*—Emily Frank
(74) *Attorney, Agent, or Firm*—Stanzione & Kim LLP

(57) ABSTRACT

An optical pickup actuator includes a lens holder on which a plurality of object lenses to use in recording/reproducing information onto/from different kinds of optical media are mounted, a tilting unit tilting the lens holder, and a controller controlling the tilting unit to tilt the lens holder about one of the object lenses that is appropriate to use in recording/reproducing information onto/from a kind of optical medium to be used.

29 Claims, 10 Drawing Sheets

OPTICAL PICKUP ACTUATOR AND OPTICAL RECORDING/REPRODUCING APPARATUS HAVING THE SAME

CROSS-REFERENCE TO RELATED APPLICATIONS

This application claims the benefit of Korean Patent Application No. 2005-35057 filed on Apr. 27, 2005, in the Korean Intellectual Property Office, the disclosure of which is incorporated herein by reference.

BACKGROUND OF THE INVENTION

1. Field of the Invention

An aspect of the present invention relates in general to an optical recording/reproducing apparatus, and more specifically to an optical pickup actuator performing tilting control of a lens holder on which a plurality of object lenses are mounted, and an optical recording/reproducing apparatus having the same.

2. Description of the Related Art

Generally, an optical pickup for recording and/or reproducing information onto and/or from an optical medium such as a CD (Compact Disk) or a DVD (Digital Versatile Disk) is provided with an optical system including an object lens for focusing light from a light source onto the optical medium to record/reproduce information onto/from the optical medium, and an optical pickup actuator for adjusting a distance between the object lens and the optical medium and a position and a tilt of the object lens relative to the optical medium.

The optical pickup actuator performs focusing control, tracking control, and tilting control of the object lens. The focusing control is performed to maintain a fixed distance between the optical medium and the object lens. The tracking control is performed to control a position of the object lens in a radial direction of the object medium so that the object lens follows a desired track on the optical medium. Lastly, the tilting control is performed to tilt the object lens so that light passing through the object lens is perpendicular to a surface of the optical medium. Particularly, the tilting control is required to reduce errors in information to be recorded/reproduced due to aberrations caused by a tilt in the object lens relative to the optical medium.

Figure 1A:
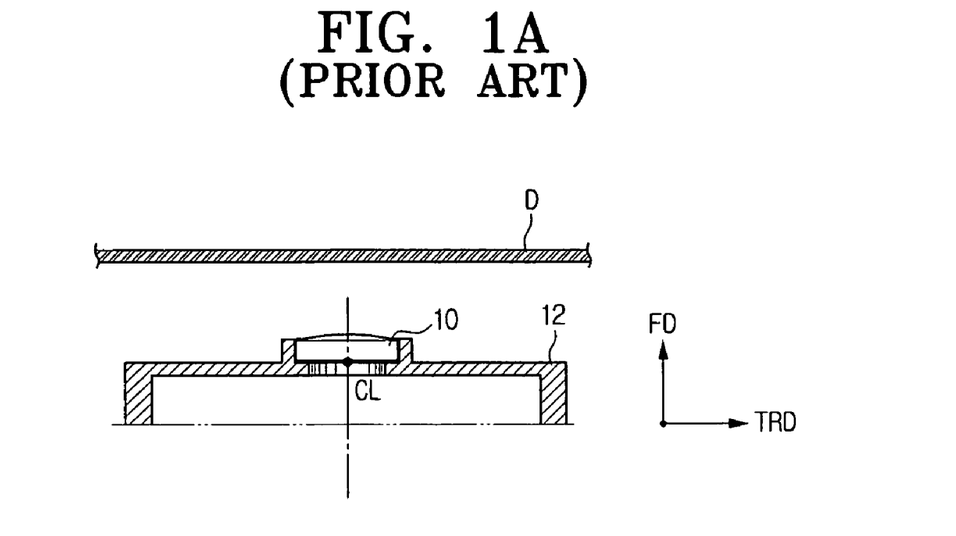
FIGS. 1A and 1B are sectional views explaining a tilting operation of a lens holder on which one object lens is mounted according to the related art.
Figure 1B:
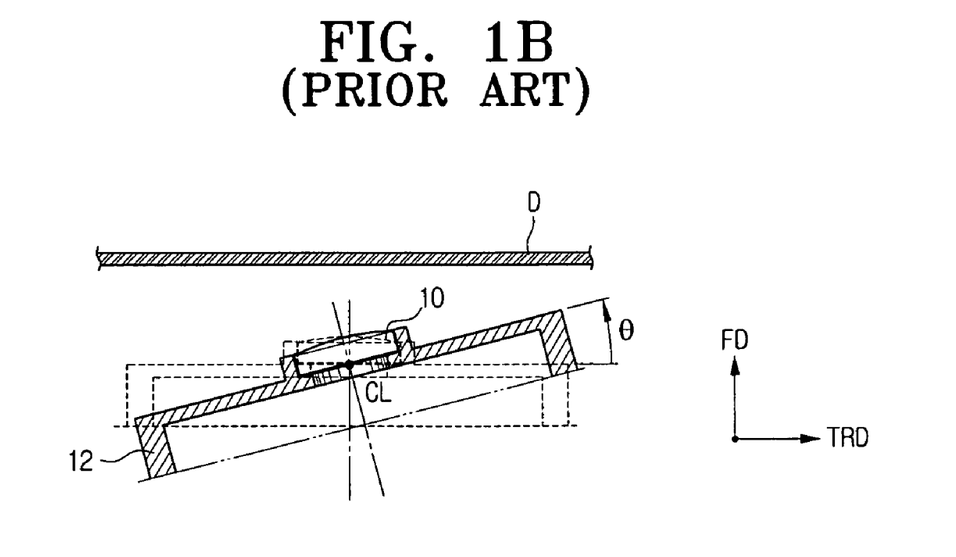

In tilting control, when one object lens 10 is used in an optical pickup as shown in FIGS. 1A and 1B, the object lens 10 is arranged at a central axis CL of a lens holder 12, and the lens holder 12 is tilted about the central axis CL. Therefore, although the lens holder 12 may be tilted, an offset of the object lens is not generated in the focusing direction FD and the tracking direction TRD.

Figure 2A:
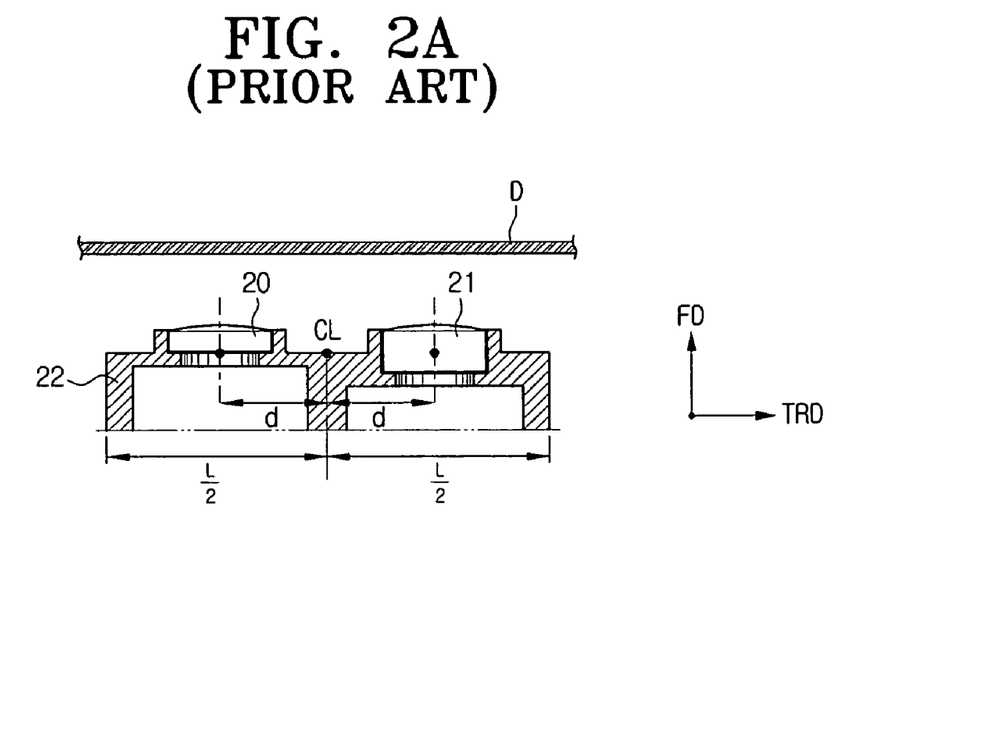
FIGS. 2A and 2B are sectional views explaining a tilting operation of a lens holder on which two object lenses are mounted according to the related art.
Figure 2B:
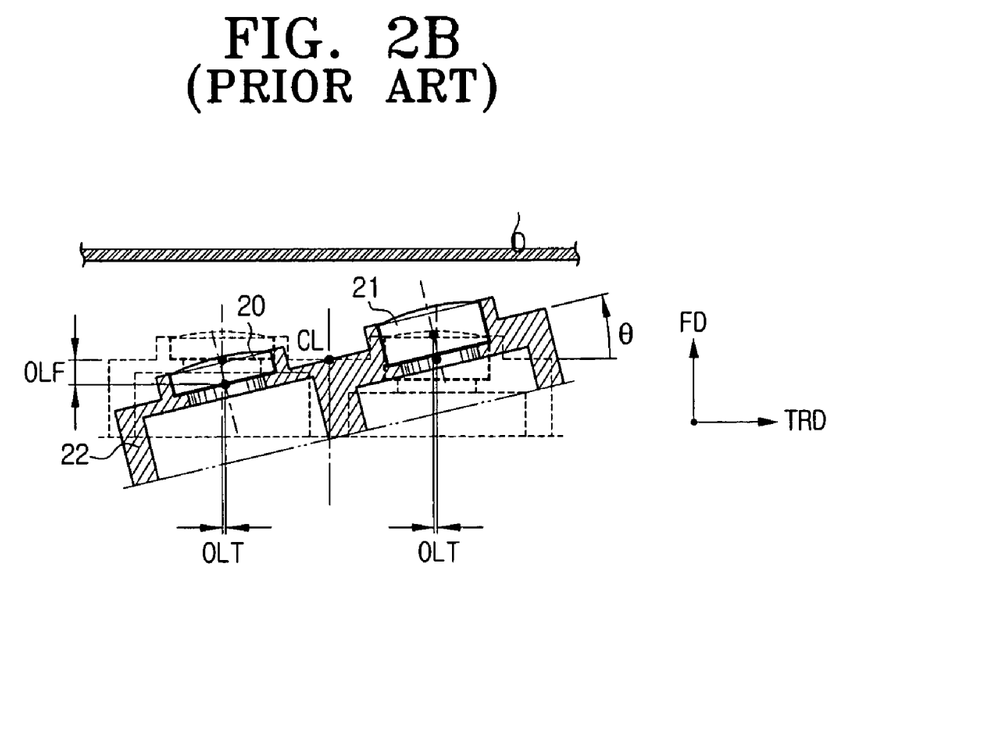

FIGS. 2A and 2B show a newer type of optical pickup actuator in which a plurality of object lenses are mounted on a lens holder for use with optical media D having different recording densities.

In FIGS. 2A and 2B, two object lenses 20, 21 are mounted in parallel on one lens holder 22 in the tracking direction TRD. When the lens holder 22 is tilted about its central axis CL as shown in FIG. 2B, an offset is generated in the focusing direction FD and the tracking direction TRD with respect to both of the object lenses 20, 21. This offset is computed as follows.

$$OLF = d \sin \theta$$

$$OLT = d(1 - \cos \theta) \quad \text{[Equation 1]}$$

Here, OLF indicates an offset amount of the object lenses 20, 21 in the focusing direction FD, and OLT indicates an offset amount of the object lenses 20, 21 in the tracking direction TRD. In addition, d indicates a distance from the central axis CL of the lens holder 22 to optical axes of the object lenses 20, 21, and θ indicates a tilting angle of the lens holder 22. Here, it is assumed that the distance d from the central axis CL of the lens holder 22 to the optical axes of the object lenses 20, 21 is fixed. In the majority of cases, however, the distance between the optical axis of the object lens 20 and the central axis CL of the lens holder 22 is different from the distance between the optical axis of the object lens 21 and the central axis CL of the lens holder 22.

When the object lens offset is generated, it is necessary to shift the object lenses 20, 21 by the offset amount OLF in the focusing direction FD, and by the offset amount OLT in the tracking direction TRD.

In other words, tilting control is always accompanied by focusing control and tracking control. Unfortunately, however, this mechanism only increases a processing load on a controller (not shown) which is in charge of all the controls.

Moreover, as a result of the shifting of the object lenses in the focusing direction FD by the offset amount OLF and in the tracking direction TRD by the offset amount OLT necessitated by the tilting control, a focusing margin (a space in which the lens holder 22 can move in the focusing direction FD for focusing control of the object lenses 20, 21) and a tracking margin (a space in which the lens holder 22 can move in the tracking direction TRD for tracking control of object lenses 20, 21) are reduced. As expressed in Equation 1, the offset amount OLF and the offset amount OLT increase in proportion to an increase in the tilting angle (θ) of the lens holder 22, so that at an extreme tilting angle, it may not be possible to perform focusing control and tracking control. In addition, if the optical medium D is severely deformed, the lens holder 22 and the optical medium D may collide with each other. Unfortunately, these problems have grown more serious with the development of a high-density (HD) optical medium D because the distance between the object lenses 20, 21 and the HD optical medium D is even shorter than it is for an earlier kind of optical medium D.

SUMMARY OF THE INVENTION

It is, therefore, an aspect of the present invention to provide an optical pickup actuator enabling a more stable system to be realized, and an optical recording/reproducing apparatus having the same.

In accordance with an aspect of the invention, an optical pickup actuator includes a lens holder on which a plurality of object lenses to use in recording/reproducing information onto/from different kinds of optical media are mounted, a tilting unit tilting the lens holder, and a controller controlling the tilting unit to tilt the lens holder about one of the object lenses that is appropriate to use in recording/reproducing information onto/from a kind of optical medium to be used.

The tilting unit may include tilting coils installed on the lens holder, a power supply supplying currents to the tilting coils, magnets interacting with the tilting coils having the currents supplied thereto, thereby tilting the lens holder, and supports elastically supporting the lens holder to enable the lens holder to move. The tilting coils may include a first tilting coil and a second tilting coil arranged at the lower portion of the lens holder in parallel with a tracking direction of the optical pickup actuator, and the controller may control the power supply to adjust respective currents supplied to the first tilting coil and the second tilting coil. Moreover, the power supply may include a first power supply supplying a first current to the first tilting coil, and a second power supply supplying a second current to the second tilting coil. The supports may include a first support electrically connecting the first tilting coil to the first power supply, and a second support electrically connecting the second tilting coil to the second power supply. The first support and the second support may be wire spring supports elastically supporting the lens holder. The controller may control the first power supply to adjust the first current supplied to the first tilting coil, and may control the second power supply to control the second current supplied to the second tilting coil. The plurality of object lenses may include a first object lens to use in recording/reproducing information onto/from a CD or a DVD, and a second object lens to use in recording/reproducing information onto/from an HD DVD.

In accordance with another aspect of the invention, an optical pickup actuator includes a lens holder including a first object lens and a second object lens to use in recording/reproducing information onto/from different kinds of optical media, the first object lens and the second object lens being mounted on opposite sides of a central axis of the lens holder, a tilting unit tilting the lens holder, and a controller controlling the tilting unit to tilt the lens holder about an axis parallel to the central axis of the lens holder and spaced apart from the central axis of the lens holder by a predetermined distance towards one of the first object lens and the second object lens that is appropriate to use in recording/reproducing information onto/from a kind of optical medium to be used.

In accordance with another aspect of the invention, an optical recording/reproducing apparatus includes an optical pickup recording/reproducing information onto/from an optical medium, the optical pickup including an actuator driving a plurality of object lenses and being movable in a tracking direction of the optical medium, and a controller controlling operation of the optical pickup. The actuator may include a lens holder on which the plurality of object lenses are mounted, tilting coils installed on the lens holder, a power supply supplying currents to the tilting coils, and magnets interacting with the tilting coils having the currents supplied thereto, thereby tilting the lens holder. The controller may control the power supply to tilt the lens holder about a central axis of one of the plurality of object lenses that is appropriate to use in recording/reproducing information onto/from a kind of the optical medium to be used.

In accordance with another aspect of the invention, an optical pickup actuator includes a lens holder on which a plurality of object lenses are mounted, a tilting unit to tilt the lens holder, and a controller to control the tilting unit to tilt the lens holder about a selected one of the object lenses.

Additional aspects and/or advantages of the invention will be set forth in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 6:
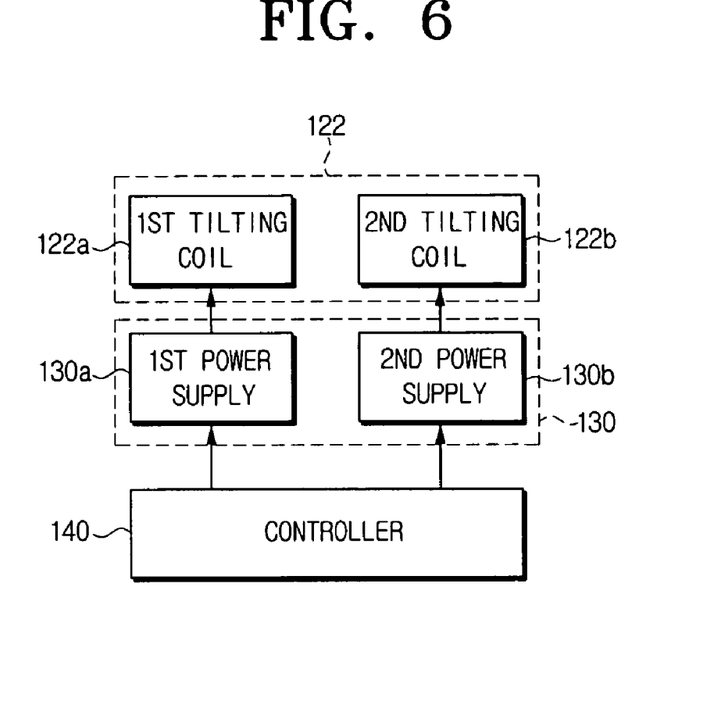
FIG. 6 is a schematic block diagram showing elements for performing tilting control of the optical pickup actuator in FIG. 3.

Referring to FIGS. 3 to 6, an optical pickup actuator 100 according to one embodiment of the present invention includes a support holder 104 installed on a base 102, a lens holder 110 having first and second lens mounting holes 112, 114 on which a plurality of object lenses 106, 108 having different working distances are mounted, a tilting unit 120 (see FIGS. 8A and 8B) for tilting the lens holder 110, tracking coils 134 for driving the lens holder 110 in a tracking direction TRD, and a controller 140 for controlling the tilting unit 120 (see FIG. 6).

Figure 3:
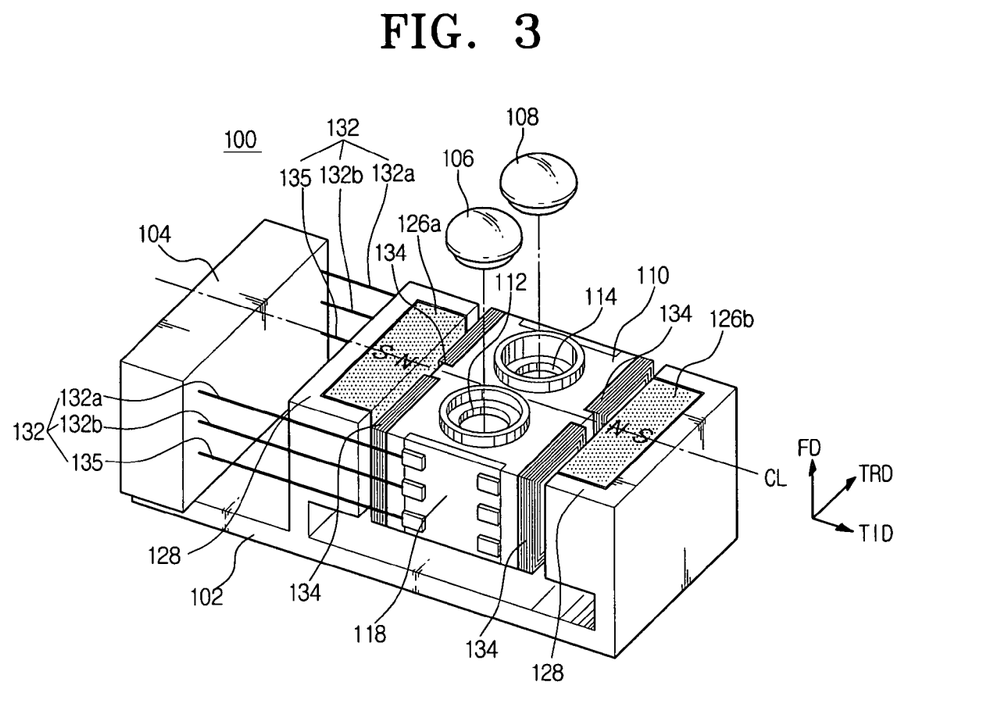
FIG. 3 is a perspective view of an optical pickup actuator according to one embodiment of the present invention.

The plurality of object lenses 106, 108 includes a first object lens 106 for recording/reproducing information onto/from an optical disk having a relatively lower recording density, and a second object lens 108 for recording/reproducing information onto/from an optical disk having a relatively higher recording density (hereinafter referred to as an HD optical disk). In detail, the first object lens 106 is able to record/reproduce information onto/from a low-density optical disk, such as a DVD disk (hereinafter referred to simply as a DVD) as well as a CD disk (hereinafter referred to simply as a CD). The second object lens 108 is able to record/reproduce information onto/from a high-density optical disk having a higher density than a DVD, e.g., an HD DVD optical disk (hereinafter referred to simply as an HD DVD). The number of object lenses is not limited to two. For example, in the case of recording/reproducing information onto/from at least three kinds of optical disks having different recording densities, at least three object lenses having different working distances are used.

Suppose that two object lenses 106, 108 are installed on the lens holder 110. Then, the lens holder 110 has a first lens mounting hole 112 in which the first object lens 106 is mounted and a second lens mounting hole 114 in which the second object lens 108 is mounted. That is, the number of lens mounting holes formed in the lens holder 110 corresponds to the number of object lenses to be mounted thereon. The first and second lens mounting holes 112, 114 are arranged in the radial direction, i.e., the tracking direction TRD, of the optical medium D. Moreover, the upper side of the lens holder 110 is opened by the lens mounting holes 112, 114, and the lower side has a shape of a hexahedron opened through a coil mounting part 116 (see FIG. 5). The lens holder 110 is formed of plastic by injection molding.

The tilting unit 120 includes tilting coils 122, magnets 126, power supplies 130, and supports 132.

The tilting coils 122 include a first tiling coil 122a and a second tilting coil 122b. The first and second tilting coils 122a, 122b are installed tightly against an inner wall of the coil mounting part 116 of the lens holder 110 (See FIG. 5), so that they are arranged in parallel in the tracking direction TRD. The tilting coils 122, which interact with the magnets 126, not only tilt the lens holder 110, but also drive the lens holder 110 in the focusing direction FD. As an alternative to this embodiment, focusing coils can also be installed on the lens holder 110.

Figure 4:
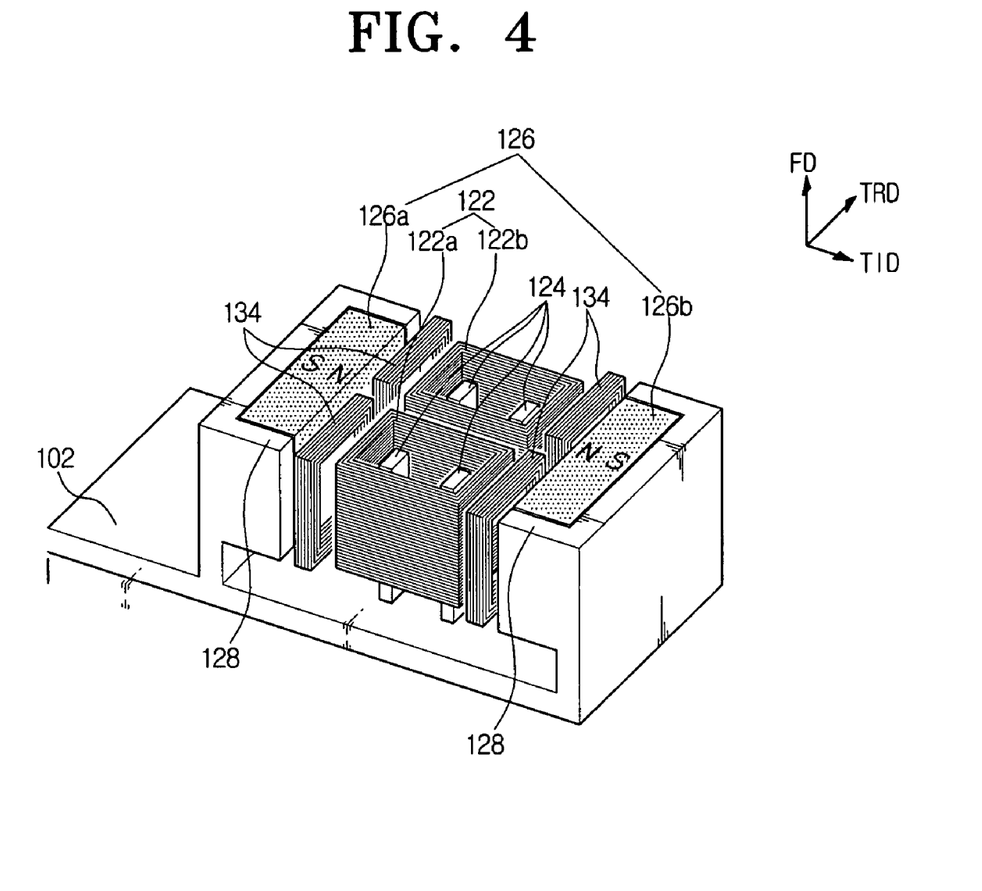
FIG. 4 is a perspective view of the optical pickup actuator in FIG. 3 in which a lens holder has been removed from the optical pickup actuator.
Figure 5:
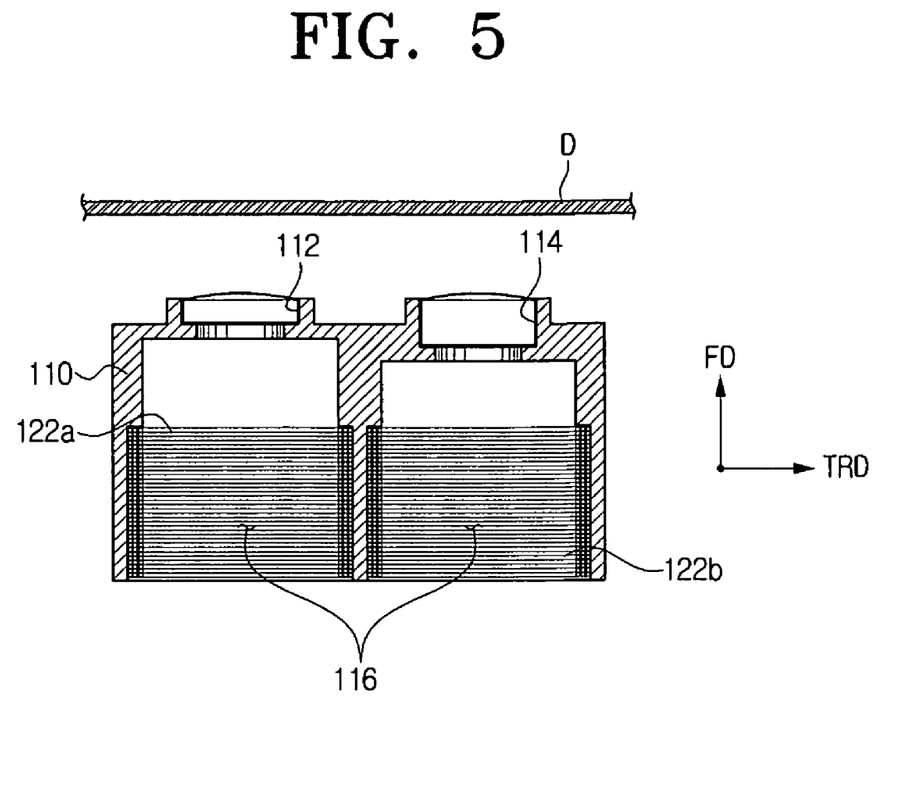
FIG. 5 is a sectional view showing how tilting coils are installed in a lens holder in the optical pickup apparatus in FIG. 3.

The magnets 126 include a first unipolar magnet 126a and a second unipolar magnet 126b. These first and second unipolar magnets 126a, 126b are arranged in parallel in the tangential direction TID of the optical medium D on opposite sides of the lens holder 110. The unipolar magnets 126a, 126b are disposed in such a manner that their magnetic fluxes are oriented in different directions relative to one other. The unipolar magnets 126a, 126b are involved in all of the focusing, tilting, and tracking control. In this embodiment, the north (N) poles of the unipolar magnets 126a, 126b face towards each other.

Referring to FIG. 6, the power supply 130 includes a first power supply 130a for providing power to the first tilting coil 122a and a second power supply 130b for providing power to the second tilting coil 122b. The first and second power supplies 130a, 130b are connected to the controller 140 to receive control signals from the controller 140.

Referring to FIG. 3, the supports 132 include three pairs of supports 132a, 132b, 135 each having one end attached to the support holder 104 and another end soldered to a connection board 118 attached to the outside of the lens holder 110. Two pairs of the supports 132a, 132b, i.e., first and second pairs of supports 132a, 132b, are used to provide power to the first and second tilting coils 122a, 122b, respectively, and the other pair of supports, i.e., a third support pair of supports 135, is used to provide power to the tracking coils 134. Therefore, the first and second pairs of supports 132a, 132b electrically connect the first and second power supplies 130a, 130b, respectively, to the first and second tilting coils 122a, 122b, respectively. The third pair of supports 135 electrically connects a power supply (not shown) to the tracking coils 134 to provide power to the tracking coils 134. The supports 132 are made of wire springs having a predetermined rigidity, and elastically support the lens holder 110.

Referring to FIG. 4, the tracking coils 134 are installed as two pairs of tracking coils 134, with each pair of the two pairs of tracking coils 134 facing a respective one of the magnets 126 installed on the lens holder 110. Interactions between the two pairs of tracking coils 134 and the magnets 126 make the lens holder 110 move in the tracking direction TRD.

The controller 140 controls the power supply (not shown) for the tracking coils 134 and the first and second power supplies 130a, 130b using tracking, focusing, and tilting control information detected by a photodetector (not shown) to perform tracking, focusing, and tilting control. In performing tilting control, the controller 140 controls currents supplied to the first and second tilting coils 122a, 122b to make the lens holder 110 tilt the object lenses 106, 108 in accordance with the optical medium D being used.

In FIG. 4, reference numerals 124 and 128 indicate inner yokes and outer yokes, respectively.

The inner yokes 124 are installed on the base 102 in two pairs so that each pair of the inner yokes 124 is inside a respective one of the first and second tilting coils 122a, 122b. The inner yokes 124 guide the lines of magnetic force of the magnetic fields generated by the first and second tilting coils 122a, 122b in the focusing direction FD and the tangential direction TID, thereby magnifying the intensities of effective magnetic fields generated by the first and second tilting coils 122a, 122b.

The outside yokes 128 are also installed on the base 102, and support the unipolar magnets 126a, 126b. The outside yokes 128 guide the lines of magnetic force of the magnetic fields generated by the unipolar magnets 126a, 126b towards the lens holder 110, thereby magnifying the intensities of effective magnetic fields generated by the unipolar magnets 126a, 126b.

Referring to FIGS. 6 to 10B, a tilting control method of the optical pickup actuator according to one embodiment of the present invention will now be explained.

Figure 7:
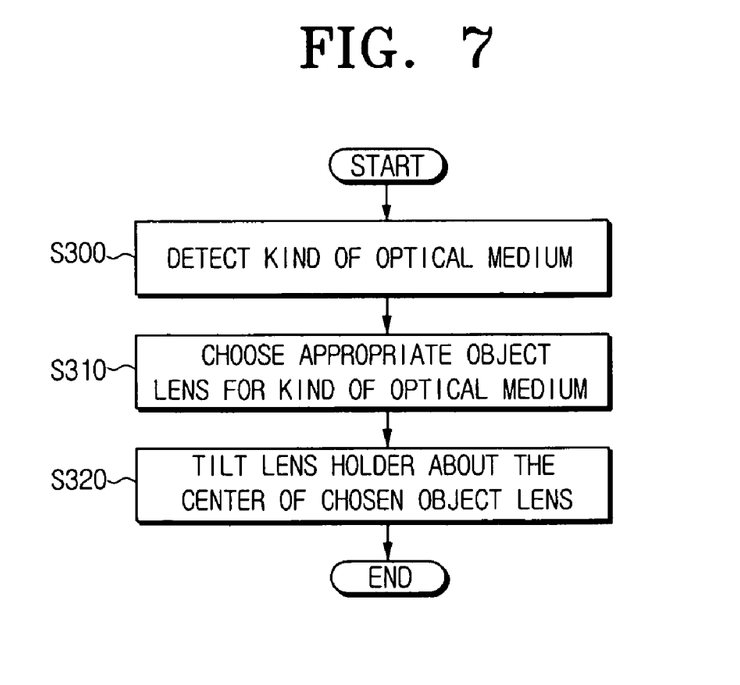
FIG. 7 is a flow chart explaining a method of performing tilting control of the optical pickup actuator in FIG. 3.

Referring to FIG. 7, the controller 140 first detects the kind of optical medium D that a user wants to use to record or reproduce information (S300). Then, the controller 140 chooses an appropriate object lens 106 or 108 (see FIG. 3) for the detected kind of optical medium D (S310) so that the object lens 106 or 108 can record or reproduce information onto or from the optical medium D. Next, the controller 140 performs tilting control by tilting the lens holder 110 about a central axis C1 or C2 of the chosen object lens 106 or 108 (see FIGS. 9A to 10B). The tilting operation of the lens holder 110 is performed as follows.

Figure 8A:
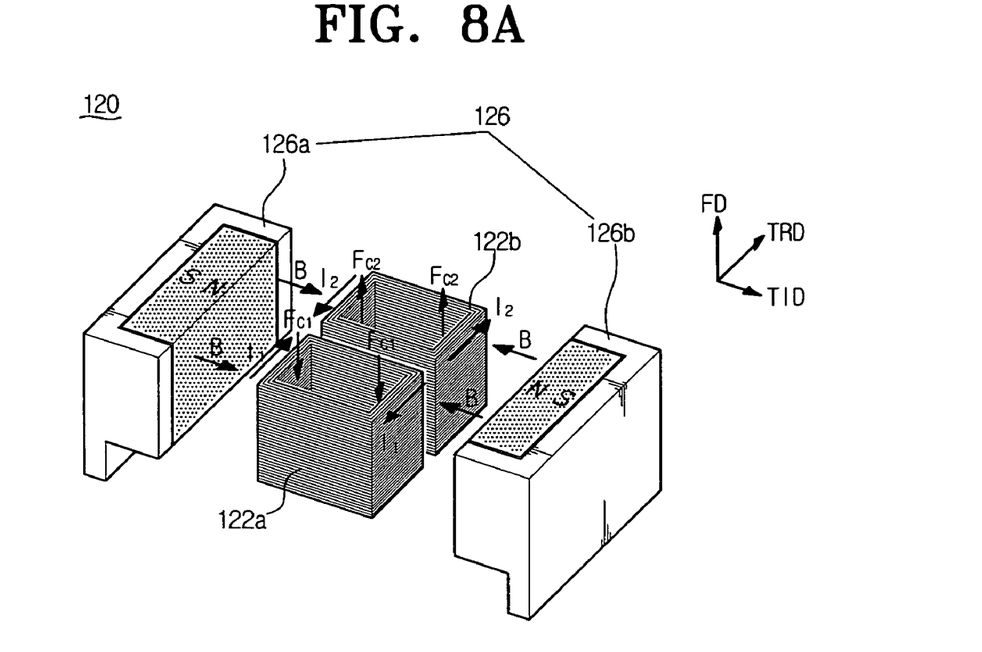
FIGS. 8A and 8B are perspective drawings for explaining the principle of tilting a lens holder in the optical pickup actuator in FIG. 3.
Figure 9A:
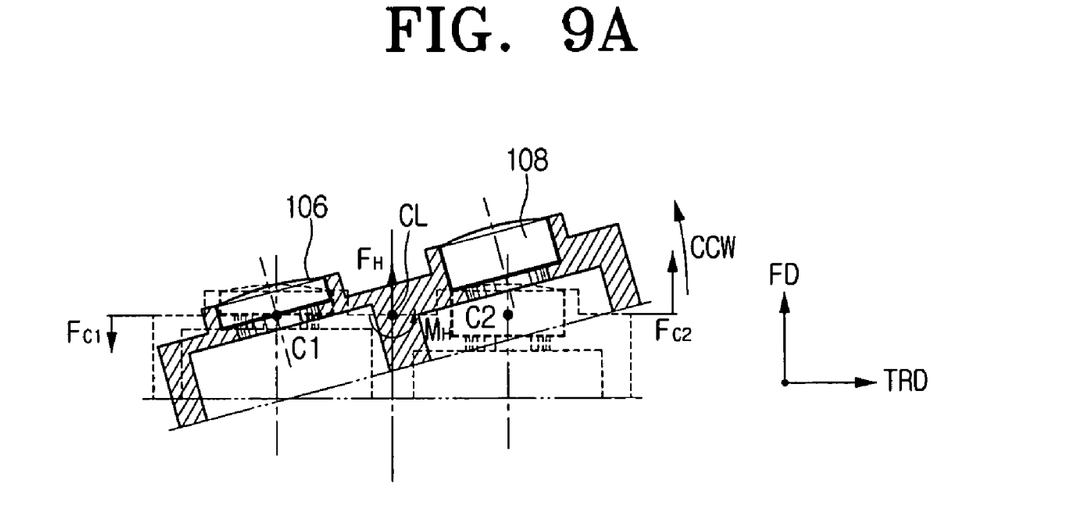
FIGS. 9A and 9B are sectional views for explaining an operation of tilting a lens holder about a central axis of a first object lens in the optical pickup actuator in FIG. 3.
Figure 10A:
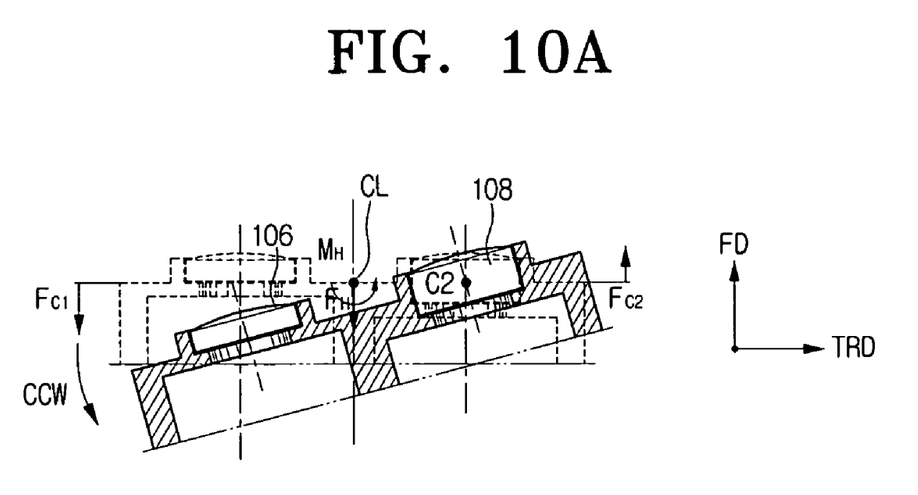
FIGS. 10A and 10B are sectional views for explaining an operation of tilting a lens holder about a central axis of a second object lens in the optical pickup actuator in FIG. 3.

As shown in FIGS. 8A, 9A, and 10A, the controller 140 (see FIG. 6) controls the first and second power supplies 130a, 130b (see FIG. 6) to respectively provide first and second currents ($I_1$, $I_2$) to the first and second tilting coils 122a, 122b, respectively, in the respective directions shown in FIG. 8A. As a result of the interaction between the first tilting coil 122a and the magnets 126, the first tilting coil 122a and the side of the lens holder 110 where the first object lens 106 is mounted are acted on by a downwardly applied force $F_{c1}$ according to Fleming's left-hand rule. On the other hand, the second tilting coil 122b and the opposite side of the lens holder 110 where the second object lens 108 is mounted are acted on by an upwardly applied force $F_{c2}$ according to Fleming's left-hand rule. The forces $F_{c1}$, $F_{c2}$ applied to the opposite sides of the lens holder 110 cause the lens holder 110 to tilt in the counterclockwise direction CCW as shown in FIGS. 9A and 10A.

If an absolute value of the force $F_{c2}$ applied to the second tilting coil 122b is greater than an absolute value of the force $F_{c1}$ applied to the first tilting coil 122a, the center of tilting shifts towards the side of the lens holder 110 where the first object lens 106 is mounted. Thus, as shown in FIG. 9A, the lens holder 110 tilts about the central axis C1 of the first object lens 106. On the contrary, if an absolute value of the force $F_{c1}$ applied to the first tilting coil 122a is greater than an absolute value of the force $F_{c2}$ applied to the second tilting coil 122b, the center of tilting shifts towards the opposite side of the lens holder 110 where the second object lens 108 is mounted. Thus, as shown in FIG. 10A, the lens holder 110 tilts about the central axis C2 of the second object lens 108. That is to say, the forces $F_{c1}$, $F_{c2}$ applied to the first and second tilting coils 122a, 122b are equivalent to a momentum MH tilting the lens holder 110 about the central axis CL in the counterclockwise direction, and a force FH applied upwardly or downwardly at the central axis CL of the lens holder 110 as shown in FIGS. 9A and 10A.

Figure 8B:
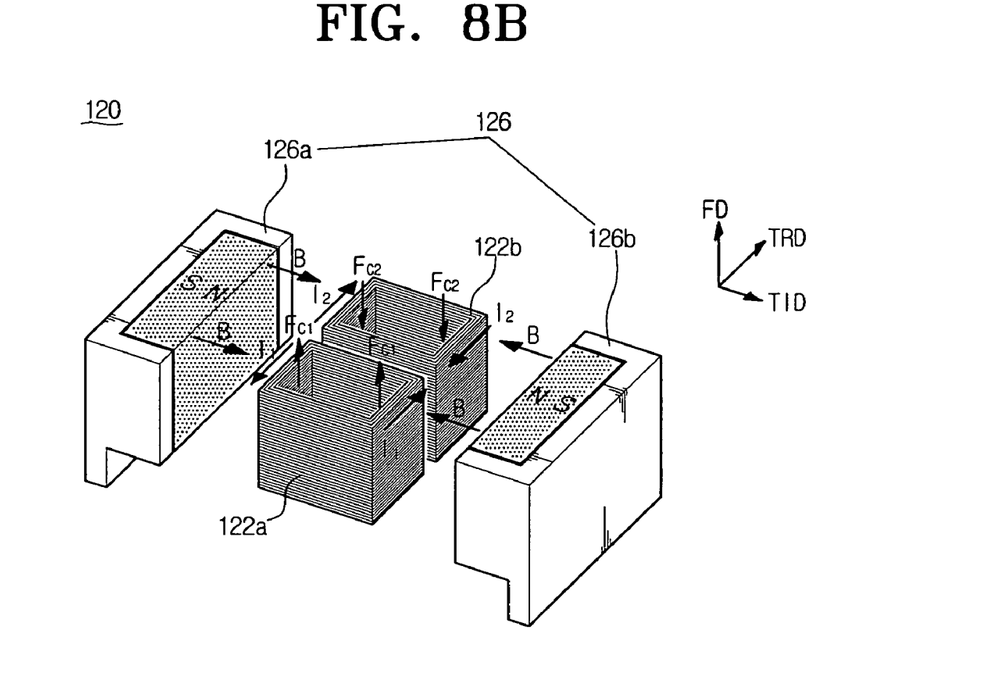
Figure 9B:
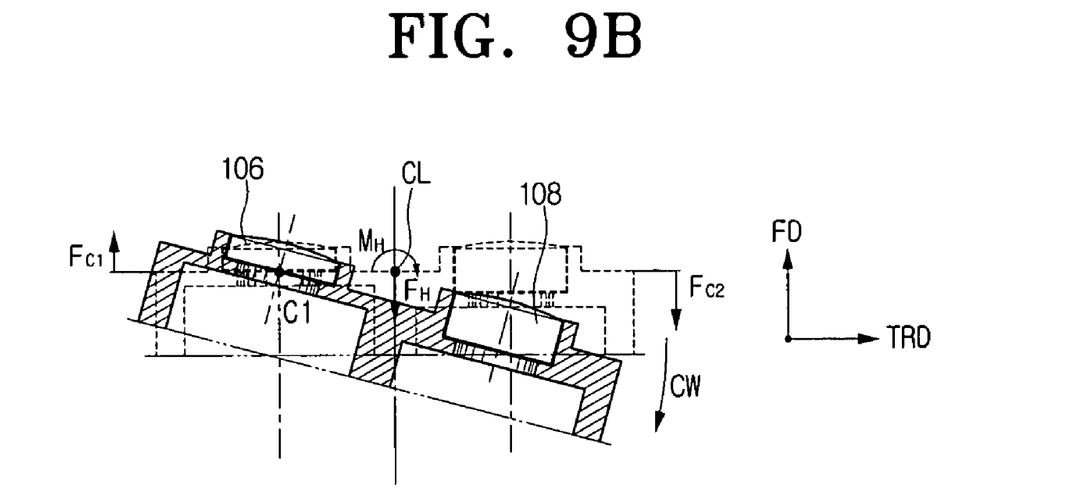
Figure 10B:
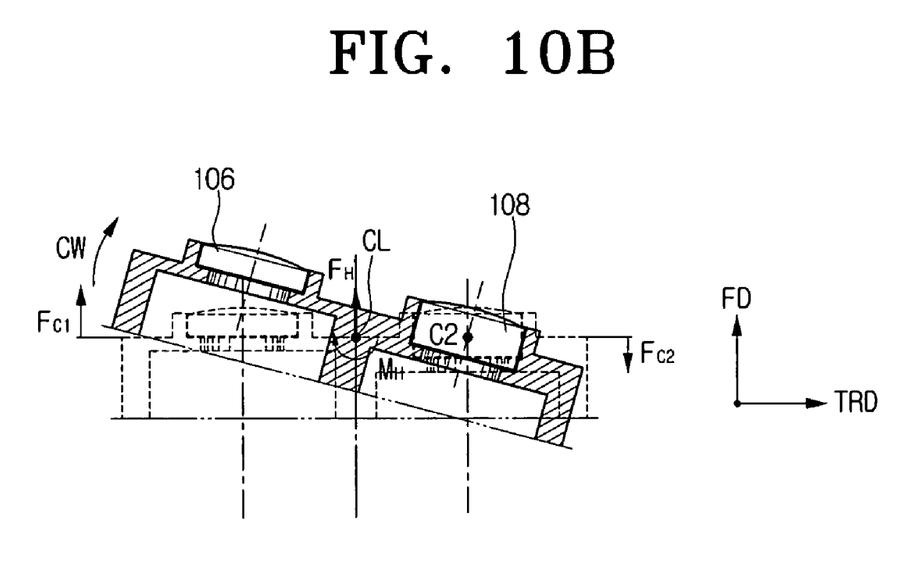

Alternatively, as shown in FIGS. 8B, 9B, and 10B, the controller 140 controls the first and second power supplies 130a, 130b to respectively provide the first and second currents ($I_1$, $I_2$) to the first and second tilting coils 122a, 122b, respectively, in the respective directions shown in FIG. 8B which are opposite to the respective directions shown in FIG. 8A. This causes the first tilting coil 122a and the side of the lens holder 110 where the first object lens 106 is mounted to be acted on by an upwardly applied force $F_{c1}$ according to Fleming's left-hand rule. On the other hand, the second tilting coil 122b and the opposite side of the lens holder 110 where the second object lens 108 is mounted are acted on by a downwardly applied force $F_{c2}$ according to Fleming's left-hand rule. The forces $F_{c1}$, $F_{c2}$ applied to the opposite sides of the lens holder 110 cause the lens holder 110 to tilt in the clockwise direction CW as shown in FIGS. 9B and 10B.

If an absolute value of the force $F_{c2}$ applied to the second tilting coil 122b is greater than an absolute value of the force $F_{c1}$ applied to the first tilting coil 122a, the center of tilting shifts towards the side of the lens holder 110 where the first object lens 106 is mounted. Thus, as shown in FIG. 9B, the lens holder 110 tilts about the central axis C1 of the first object lens 106. On the contrary, if an absolute value of the force $F_{c1}$ applied to the first tilting coil 122a is greater than an absolute value of the force $F_{c2}$ applied to the second tilting coil 122b, the center of tilting shifts towards the opposite side of the lens holder 110 where the second object lens 108 is mounted. Thus, as shown in FIG. 10B, the lens holder 110 tilts about the central axis C2 of the second object lens 108. That is to say, the forces $F_{c1}$, $F_{c2}$ applied to the first and second tilting coils 122a, 122b are equivalent to a momentum MH tilting the lens holder 110 about the central axis CL in the clockwise direction, and a force FH applied upwardly or downwardly at the central axis CL of the lens holder 110 as shown in FIGS. 9B and 10B.

Since the forces $F_{c1}$, $F_{c2}$ applied to the tilting coils 122a, 122b are proportional to the magnitudes of the first and second currents $I_1$, $I_2$ provided to the tilting coils 122a, 122b, the momentum MH tilting the lens holder 110 about the central axis CL can be controlled by adjusting the magnitudes of the first and second currents $I_1$, $I_2$. The above-described tilting control method may be modified depending on the magnitude of an elastic force applied to the lens holder 110 by the supports 132 (see FIG. 3).

Figure 11:
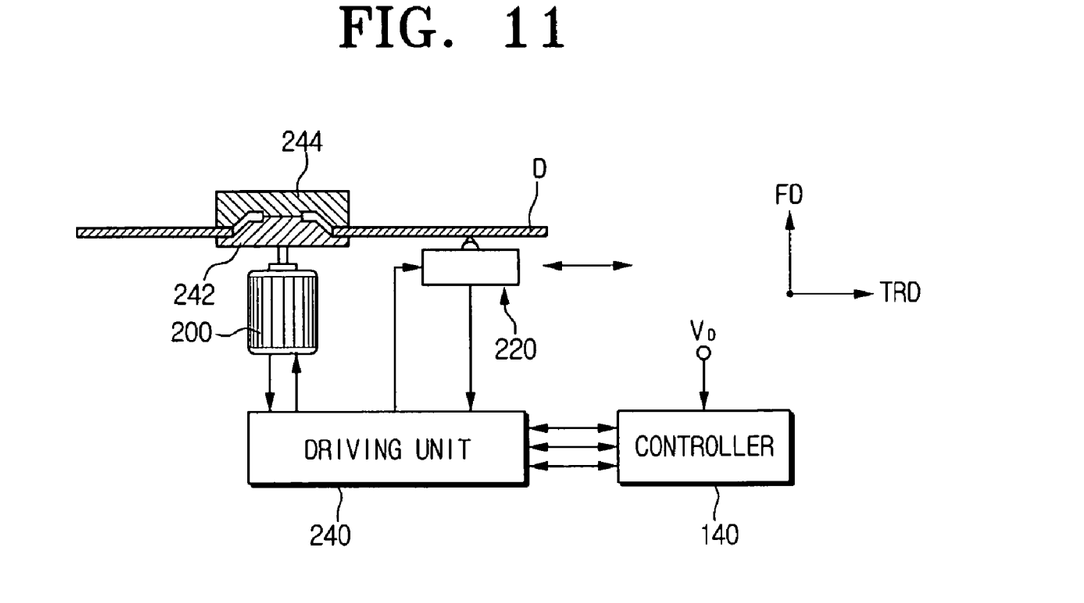
FIG. 11 is a schematic block diagram of an optical recording/reproducing apparatus according to one embodiment of the present invention.

FIG. 11 is a schematic block diagram of an optical recording/reproducing apparatus to which an optical pickup actuator according to one embodiment of the present invention is applied.

Referring to FIG. 11, the optical recording/reproducing apparatus includes a spindle motor 200 for rotating an optical medium D such as an optical disk, an optical pickup 220 movably installed in the radial direction, i.e., the tracking direction TRD, of the optical medium D for recording and/or reproducing information onto and/or from the optical medium D, and a driving unit 240 for driving the spindle motor 200 and the optical pickup 220. In the drawing, reference numeral 242 indicates a turntable, and 244 indicates a chuck for clamping the optical medium D on the turntable 242.

The optical pickup 220 includes an optical pickup system (not shown) including object lenses (106, 108 in FIG. 3) for focusing light emitted from a light source onto the optical medium D, and an optical pickup actuator (100 in FIG. 3) for driving the object lenses (106, 108 in FIG. 3) about three axes FD, TRD, TID (TID is shown in FIGS. 8A and 8B and is perpendicular to the plane of FIG. 11). The optical pickup actuator 100 according to one embodiment of the present invention that was described above with reference to FIGS. 3 to 10B may be utilized in the optical recording/reproducing apparatus shown in FIG. 11.

In the optical recording/reproducing apparatus shown in FIG. 11, reflected light from the optical medium D is detected by a photodetector (not shown) provided in the optical pickup 220, and is converted to an electrical signal by the photodetector. This electrical signal is inputted to the controller 140 through the driving unit 240. Then, the controller 140 controls the driving unit 240 to control the movement of the optical pickup 220 in the tracking direction TRD and the rotation of the spindle motor 200. Also, the controller 140 performs tracking, focusing, and tilting control according to the electrical signal.

As explained so far, according to an embodiment of the present invention, the lens holder is tilted about the central axis of the object lens corresponding to the kind of the optical medium D being used. In this manner, offsets of the lens holder in the tracking direction TRD and the focusing direction FD due to the tilting operation can be prevented.

By preventing the offsets of the lens holder due to the tilting operation, tracking control and focusing control that always used to accompany tilting control in the related art are not required in an embodiment of the present invention.

Furthermore, by preventing the offsets of the lens holder due to the tilting operation, greater focusing and tracking margins are secured, thereby realizing a more stable system.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical pickup actuator comprising:
   a lens holder on which a plurality of object lenses to use in recording/reproducing information onto/from different kinds of optical media are mounted;
   a tilting unit to tilt the lens holder; and
   a controller to control the tilting unit to tilt the lens holder about one of the object lenses that is appropriate to use in recording/reproducing information onto/from a kind of optical medium to be used;
   wherein each of the object lenses has a tilting axis that is different from a tilting axis of every other one of the object lenses.

2. The optical pickup actuator of claim 1, wherein the tilting unit comprises:
   tilting coils installed on the lens holder;
   a power supply to supply currents to the tilting coils; and
   magnets to interact with the tilting coils having the currents supplied thereto, thereby tilting the lens holder.

3. The optical pickup actuator of claim 2, wherein the tilting unit further comprises supports elastically supporting the lens holder to enable the lens holder to move.

4. The optical pickup actuator of claim 3, wherein:
- the tilting coils comprise a first tilting coil and a second tilting coil arranged at a lower portion of the lens holder in parallel with a tracking direction of the optical pickup actuator; and
- the controller controls the power supply to adjust respective currents supplied to the first tilting coil and the second tilting coil.

5. The optical pickup actuator of claim 4, wherein the power supply comprises:
- a first power supply to supply a first current to the first tilting coil; and
- a second power supply to supply a second current to the second tilting coil.

6. The optical pickup actuator of claim 5, wherein the supports comprise: a first support electrically connecting the first tilting coil to the first power supply; and a second support electrically connecting the second tilting coil to the second power supply.

7. The optical pickup actuator of claim 6, wherein the first support and the second support are wire spring supports.

8. The optical pickup actuator of claim 1, wherein the plurality of object lenses comprise:
- a first object lens to use in recording/reproducing information onto/from a CD or a DVD; and
- a second object lens to use in recording/reproducing information onto/from an HD DVD.

9. An optical pickup actuator comprising:
- a lens holder comprising a first object lens and a second object lens to use in recording/reproducing information onto/from different kinds of optical media, the first object lens and the second object lens being mounted on opposite sides of a central axis of the lens holder;
- a tilting unit to tilt the lens holder; and
- a controller to control the tilting unit to tilt the lens holder about an axis parallel to the central axis of the lens holder and spaced apart from the central axis of the lens holder by a predetermined distance towards one of the first object lens and the second object lens that is appropriate to use in recording/reproducing information onto/from a kind of optical medium to be used.

10. The optical pickup of claim 9, wherein the axis about which the lens holder is tilted is a central axis of the one of the first object lens and the second object lens that is appropriate to use in recording/reproducing information onto/from a kind of optical medium to be used.

11. The optical pickup actuator of claim 9, wherein the first object lens has a tilting axis that is different from a tilting axis of the second object lens.

12. An optical recording/reproducing apparatus comprising:
- an optical pickup to record/reproduce information onto/from an optical medium, the optical pickup comprising an actuator driving a plurality of object lenses and being movable in a tracking direction of the optical medium; and
- a controller to control operation of the optical pickup;
- wherein the actuator comprises
- a lens holder on which the plurality of object lenses are mounted,
- tilting coils installed on the lens holder,
- a power supply to supply currents to the tilting coils, and
- magnets to interact with the tilting coils having the currents supplied thereto, thereby tilting the lens holder;
- wherein the controller controls the power supply to tilt the lens holder about a central axis of one of the plurality of object lenses that is appropriate to use in recording/reproducing information onto/from a kind of the optical medium to be used; and
- wherein each of the object lenses has a tilting axis that is different from a tilting axis of every other one of the object lenses.

13. The apparatus of claim 12, wherein the tilting coils comprise a first tilting coil and a second tilting coil arranged at a lower portion of the lens holder in parallel with the tracking direction;
- wherein the power supply comprises a first power supply to supply a first current to the first tilting coil, and a second power supply to supply a second current to the second tilting coil; and
- wherein the controller controls the first power supply to adjust the first current supplied to the first tilting coil, and controls the second power supply to adjust the second current supplied to the second tilting coil.

14. The apparatus of claim 13, further comprising supports elastically supporting the lens holder to enable the lens holder to move.

15. The apparatus of claim 14, wherein the supports comprise:
- a first support electrically connecting the first tilting coil to the first power supply; and
- a second support electrically connecting the second tilting coil to the second power supply.

16. An optical pickup actuator comprising:
- a lens holder on which a plurality of object lenses are mounted;
- a tilting unit to tilt the lens holder; and
- a controller to control the tilting unit to tilt the lens holder about a selected one of the object lenses;
- wherein each of the object lenses has a tilting axis that is different from a tilting axis of every other one of the object lenses.

17. The optical pickup actuator of claim 16, wherein the controller controls the tilting unit to tilt the lens holder about a central axis of the selected one of the object lenses.

18. The optical pickup actuator of claim 17, wherein the controller controls the tilting unit to tilt the lens holder about the central axis of the selected one of the object lenses while maintaining the central axis of the selected one of the object lenses in a fixed orientation at a fixed position.

19. The optical pickup actuator of claim 16, wherein the plurality of object lenses are to use in recording and/or reproducing information onto and/or from different kinds of optical media; and
- wherein the selected one of the object lenses is one of the plurality of object lenses that is to be used in recording and/or reproducing information onto and/or from a selected one of the different kinds of optical media.

20. The optical pickup actuator of claim 19, wherein the plurality of object lenses have different working distances.

21. The optical pickup actuator of claim 19, wherein the different kinds of optical media comprise a first kind of optical medium having a first recording density and a second optical medium having a second recording density different from the first recording density; and
- wherein the plurality of object lenses comprise a first object lens to use in recording and/or reproducing information onto and/or from the first kind of optical medium, and a second object lens to use in recording and/or reproducing information onto and/or from a second kind of optical medium.

22. The optical pickup actuator of claim 21, wherein the first kind of optical medium is a CD or a DVD; and wherein the second kind of optical medium is an HD DVD.

23. The optical pickup actuator of claim 16, wherein the tilting unit comprises:

magnets;

tilting coils disposed on the lens holder; and a power supply to supply currents to the tilting coils to cause the tilting coils to interact with the magnets and tilt the lens holder about the selected one of the object lenses.

24. The optical pickup actuator of claim 23, wherein the plurality of object lenses comprise a first object lens and a second object lens;

wherein the tilting coils comprise a first tilting coil corresponding to the first object lens, and a second tilting coil corresponding to the second object lens; and wherein the power supply supplies a first current to the first tilting coil, and supplies a second current to the second tilting coil.

25. The optical pickup actuator of claim 24, wherein when the second current is greater than the first current, the tilting coils tilt the lens holder about the first object lens; and wherein when the first current is greater than the second current, the tilting coils tilt the lens holder about the second object lens.

26. The optical pickup actuator of claim 23, wherein the controller controls the power supply to adjust magnitudes of the currents supplied to the tilting coils to control a momentum tilting the lens holder about the selected one of the object lenses, thereby controlling a tilting angle of the lens holder about the selected one of the object lenses.

27. The optical pickup actuator of claim 16, wherein the plurality of object lenses are to use in recording and/or reproducing information onto and/or from different kinds of optical media;

wherein the controller controls the tilting unit to tilt the lens holder about one of the object lenses when information is to be recorded onto and/or reproduced from one of the different kinds of optical media; and wherein the controller controls the tilting unit to tilt the lens holder about another one of the object lenses when information is to be recorded onto and/or reproduced from another one of the different kinds of optical media.

28. The optical pickup actuator of claim 27, wherein the controller controls the tilting unit to tilt the lens holder about a central axis of the one of the object lenses when information is to be recorded onto and/or reproduced from the one of the different kinds of optical media; and wherein the controller controls the tilting unit to tilt the lens holder about a central axis of the other one of the object lenses when information is to be recorded onto and/or reproduced from the other one of the different kinds of optical media.

29. The optical pickup actuator of claim 27, wherein the one of the different kinds of optical media is a CD or a DVD; and wherein the other one of the different kinds of optical media is an HD DVD.

\* \* \* \* \*